(12) United States Patent
Minami et al.

(10) Patent No.: US 8,555,074 B2
(45) Date of Patent: Oct. 8, 2013

(54) METHOD AND APPARATUS FOR PROCESSING INFORMATION, AND COMPUTER PROGRAM PRODUCT

(75) Inventors: Kouichi Minami, Ishikawa (JP); Seigo Kotani, Kanagawa (JP)

(73) Assignees: PFU Limited, Ishikawa (JP); Fujitsu Limited, Kanagawa (JP)

( * ) Notice: Subject to any disclaimer, the term of this patent is extended or adjusted under 35 U.S.C. 154(b) by 1066 days.

(21) Appl. No.: 11/624,048

(22) Filed: Jan. 17, 2007

(65) Prior Publication Data
US 2007/0198861 A1 Aug. 23, 2007

(30) Foreign Application Priority Data

Jan. 18, 2006 (JP) ................................. 2006-010355
Jun. 7, 2006 (JP) ................................. 2006-158719

(51) Int. Cl.
*H04L 9/32* (2006.01)
(52) U.S. Cl.
USPC ............. 713/181; 713/176; 713/178; 726/28; 726/34
(58) Field of Classification Search
USPC ....................... 726/34, 28; 713/176, 178, 181
See application file for complete search history.

(56) References Cited

U.S. PATENT DOCUMENTS

| 5,966,446 | A | 10/1999 | Davis | |
|---|---|---|---|---|
| 6,889,324 | B1 * | 5/2005 | Kanai et al. | 713/176 |
| 7,552,335 | B2 * | 6/2009 | Iwamura | 713/176 |
| 7,627,763 | B2 * | 12/2009 | Fujimoto et al. | 713/177 |
| 2004/0001617 | A1 * | 1/2004 | Blume | 382/126 |
| 2004/0039914 | A1 * | 2/2004 | Barr et al. | 713/176 |
| 2007/0016798 | A1 * | 1/2007 | Narendra et al. | 713/189 |

FOREIGN PATENT DOCUMENTS

| CN | 1252567 A | 5/2000 |
|---|---|---|
| CN | 1416067 A | 5/2003 |
| CN | 1547344 A | 11/2003 |
| DE | 196 00 771 A1 | 4/1997 |
| EP | 1577732 A2 * | 9/2005 |
| JP | 04017466 A | 1/1992 |
| JP | 2000215379 | 8/2000 |
| JP | 2002009762 A | 1/2002 |
| JP | 2002040935 A * | 2/2002 |
| JP | 2002-271772 A | 9/2002 |
| JP | 2002-352028 | 12/2002 |
| JP | 2003162341 | 6/2003 |
| JP | 2003298575 | 10/2003 |
| JP | 2003337923 | 11/2003 |
| JP | 2004-046606 A | 2/2004 |

(Continued)

OTHER PUBLICATIONS

Pearson et al. "Trusted Computing Platforms: TCPA Technology in Context" © 2002 Prentice Hall Inc. (347 pages).*

(Continued)

*Primary Examiner* — Darren B Schwartz
*Assistant Examiner* — Thomas Gyorfi
(74) *Attorney, Agent, or Firm* — Lowe, Hauptman & Ham

(57) ABSTRACT

A data acquiring unit acquires electronic data. A tamper-resistant chip includes a storing unit that stores a confidential key specific to a device, and a collecting unit that collects device information that is internal information of the device. An attaching unit attaches collected device information to acquired electronic data. An encrypting unit encrypts the electronic data with the device information attached, using the confidential key stored in the storing unit.

16 Claims, 14 Drawing Sheets

(56) References Cited

FOREIGN PATENT DOCUMENTS

| JP | 2004260533 | | 9/2004 |
|----|------------|---|--------|
| JP | 2005236517 | A | 2/2005 |
| JP | 2005267200 | | 9/2005 |
| JP | 2005286884 | A | 10/2005 |
| JP | 2005295274 | A | 10/2005 |
| JP | 2005-317026 | | 11/2005 |
| JP | 2006-501581 | A | 1/2006 |
| WO | 01/06374 | A2 | 1/2001 |
| WO | 2004034238 | A2 | 4/2004 |

OTHER PUBLICATIONS

Wikipedia article for "Exchangeable image file format" published Dec. 12, 2005 (4 pages) http://en.wikipedia.org/w/index.php?title=Exchangeable_image_file_format&oldid=31090368&printable=yes.*

Schneier, Bruce. "Applied Cryptography, $2^{nd}$ Edition". © 1996 Bruce Schneier; published by John Wiley & Sons Inc.. Excerpt from Chapter 2 (pp. 28-44).*

Lufrano, Sonny. "Biometriic security offers futuristic protection" Published Apr. 19, 2002 by the Atlanta Business Chronicle (2 pages) http://www.bizjournals.com/atlanta/stories/2002/04/22/focus3.html?s=print.*

Salkever, Alex. "Security Blankets: One Layer Isn't Enough" Published Jun. 5, 2002 by Businessweek.com (2 pages) http://www.businessweek.com/technology/content/jun2002/tc2002065_8400.htm.*

Posting from Slashdot.org on the article "Smart Cards for Windows XP Login" Comment "Re: PIN" posted Dec. 3, 2001. http://ask.slashdot.org/comments.pl?sid=24411&cid=2648374.*

"What is two-factor authentication?—Definition from Whatis.com" Published Jul. 19, 2004 (3 pages) http://searchsecurity.techtarget.com/sDefinition/0,,sid14_gci992919,00.html.*

Dan Boneh et al. "Aggregate and Verifiably Encrypted Signatures from Bilinear Maps" Proceedings of Eurocrypt 2003, pp. 416-432. © 2003 International Association for Cryptologic Research.*

Office Action dated Oct. 17, 2008.

Chinese Patent Office Office Action dated Jun. 6, 2008 and English Translation.

German Patent Office, Office Action mailed Jul. 2, 2007 and English Translation.

Japanese Office Action for Application No. 2006-158719 mailed Jun. 7, 2011.

Japanese Office Action issued in JP2011-172374 dated Dec. 11, 2012, 3 pages.

Nakamura et al., "Overview and Recent Trend of Security Chip (Trusted Platform Module) for PCs," Information Processing Society of Japan, May 15, 2006, 11 pages. (w/Partial English Translation).

Office Action for Japanese patent application No. 2011-172374 dated Jun. 4, 2013.

* cited by examiner

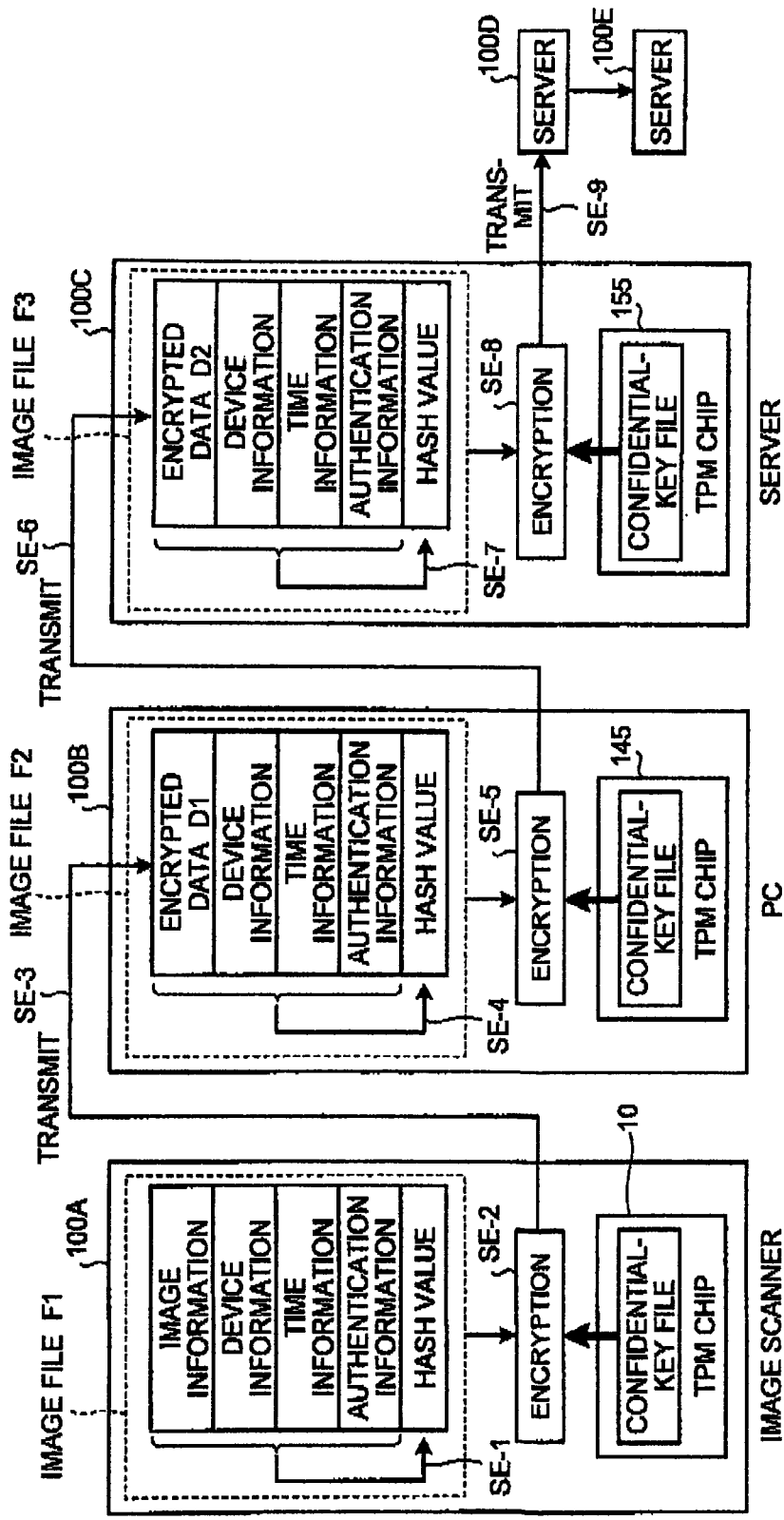

METHOD AND APPARATUS FOR PROCESSING INFORMATION, AND COMPUTER PROGRAM PRODUCT

RELATED APPLICATIONS

The present application is based on, and claims priority from, Japan Application Number 2006-010355, filed Jan. 18, 2006, and Japan Application Number 2006-158719, filed Jun. 7, 2006 the disclosures of which are hereby incorporated by reference herein in their entirety.

BACKGROUND OF THE INVENTION

1. Field of the Invention

The present invention relates to an information processing apparatus such as an image processing apparatus (an image scanner, a printer, a multi-function device, a FAX, etc.), a personal computer, and a server, an information processing method conducted by the information processing apparatus, and a computer program product.

2. Description of the Related Art

Conventionally, in a facsimile, ensuring the reliability of an image is conducted by printing a date or a route on the image.

In respect to the security enhancement that each enterprise individually pursued, enterprises with technology providing a PC platform assembled to form TCG (Trusted Computing Group), addressing to create new hardware/software having higher reliability and safety as an industry group. In the TCG, specifications of a TPM (Trusted Platform Module) chip pertaining to a security chip are stipulated for the computing platform (see Japanese Patent Application Laid-open No. 2005-317026).

However, the conventional art had possibility that an image was easily tampered, and therefore high-level reliability of the image could not be ensured.

SUMMARY OF THE INVENTION

It is an object of the present invention to at least partially solve the problems in the conventional technology.

An information processing apparatus according to one aspect of the present invention includes a data acquiring unit that acquires electronic data; a tamper-resistant chip including a storing unit that stores a confidential key specific to a device, and a collecting unit that collects device information that is internal information of the device; an attaching unit that attaches collected device information to acquired electronic data; and an encrypting unit that encrypts the electronic data with the device information attached, using the confidential key.

An information processing apparatus according to another aspect of the present invention includes a data acquiring unit that acquires electronic data; a tamper-resistant chip including a storing unit that stores a confidential key specific to a device, and a collecting unit that collects device information that is internal information of the device; an attaching unit that attaches collected device information to acquired electronic data; a generating unit that generates a hash value of the electronic data with the device information attached; and an encrypting unit that encrypts generated hash value using the confidential key.

An information processing method according to still another aspect of the present invention includes acquiring electronic data; collecting device information that is internal information of a device at a tamper-resistant chip that stores a confidential key specific to the device; attaching collected device information to acquired electronic data; and encrypting the electronic data with the device information attached, using the confidential key.

An information processing method according to still another aspect of the present invention includes acquiring electronic data; collecting device information that is internal information of a device at a tamper-resistant chip that stores a confidential key specific to the device; attaching collected device information to acquired electronic data; generating a hash value of the electronic data with the device information attached; and encrypting generated hash value using the confidential key.

A computer program product according to still another aspect of the present invention includes a computer usable medium having computer readable program codes embodied in the medium that when executed causes a computer to execute acquiring electronic data; collecting device information that is internal information of a device at a tamper-resistant chip that stores a confidential key specific to the device; attaching collected device information to acquired electronic data; and encrypting the electronic data with the device information attached, using the confidential key.

A computer program product according to still another aspect of the present invention includes a computer usable medium having computer readable program codes embodied in the medium that when executed causes a computer to execute acquiring electronic data; collecting device information that is internal information of a device at a tamper-resistant chip that stores a confidential key specific to the device; attaching collected device information to acquired electronic data; generating a hash value of the electronic data with the device information attached; and encrypting generated hash value using the confidential key.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a schematic diagram for explaining an example of a transfer process of electronic data among apparatuses configuring the information processing system according to the present embodiment.

DETAILED DESCRIPTION OF THE PREFERRED EMBODIMENTS

Exemplary embodiments of the present invention will be described in detail below with reference to the accompanying drawings. The present embodiments are not intended to limit the present invention. Specifically, although the present embodiment cites a TPM chip as an example of a chip having tamper resistance, the chip of the present invention is not limited to the TPM chip.

Figure 1:
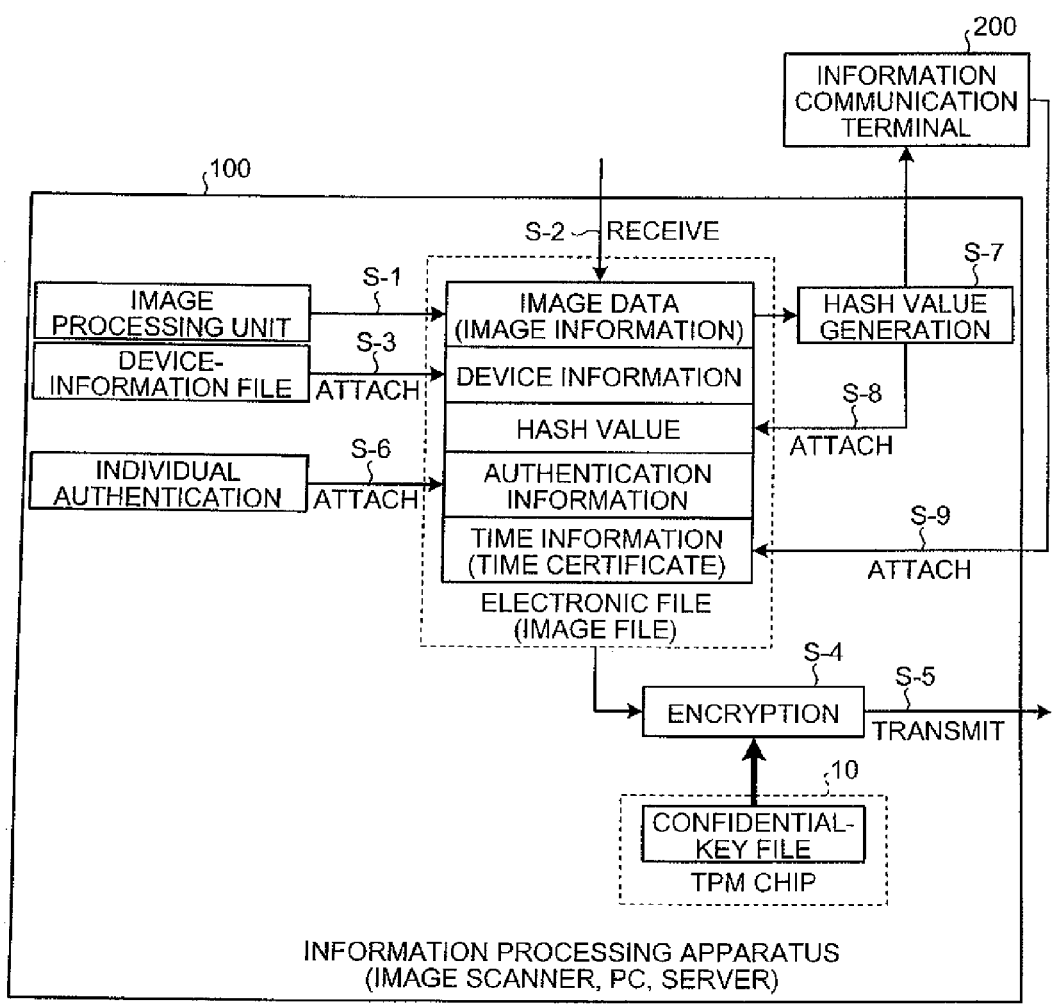
FIGS. 1 and 2 are schematic diagrams for explaining a fundamental principle of the present invention.

FIG. 1 is a schematic diagram for explaining a fundamental principle of the present invention.

The present invention briefly includes following fundamental features. An information processing apparatus 100 first acquires electronic data. Specifically, the information processing apparatus 100 reads the electronic data (e.g., image information) with a preset image processing unit when the image processing apparatus is an image reading apparatus such as an image scanner, a printer, a multi-function device, or a FAX (step S-1), and the information processing apparatus 100 receives the electronic data from another information processing apparatus communicably connected (not shown) when the information processing apparatus is, for example, a personal computer (PC) or a server (step S-2).

The information processing apparatus 100, with a TPM chip 10 that is a chip having taper resistance and provided by the information processing apparatus, collects device information (apparatus information) that is information in a device (the information processing apparatus), and the information processing apparatus 100 stores the collected device information in a device-information file and attaches the device information to the electronic data (step S-3). This generates an electronic file (e.g., an image file when the electronic data is image information) including the electronic data and the device information.

The device information is information that includes, for example, device-specific information that is information specific to the device (the information processing apparatus 100), device operation state information that is information related to an operation state of the device (the information processing apparatus 100) acquiring (reading or receiving) the electronic data, network information that is information related to a network, and peripheral device information that is information related to a peripheral device connected to the device (the information processing apparatus 100). The device-specific information is information such as a name of the manufacturer, a model, a serial number, and a date of manufacture that are stored at the time of the factory shipment. The device operation state information is information that includes, for example, reading mode information when the information processing apparatus 100 is an image reading apparatus such as an image scanner, a printer, a multi-function device, or a FAX, and the device operation state information is information that includes, for example, an operation log including setting information during operation and an operation result when the information processing apparatus 100 is, for example, a PC or a server. The reading mode information is information relating to a reading mode when the image processing unit reads the electronic data (e.g., image information), and the reading mode information is information of, for example, resolution, color/monochrome, and binary/multi-value.

Returning to the description of FIG. 1, the information processing apparatus 100 encrypts the electronic file generated at step S-3 with a confidential key specific to the device (the information processing apparatus) stored in a confidential-key file provided by the TPM chip 10 (step S-4).

The information processing apparatus 100 then transmits the electronic file encrypted at step S-4 to another information processing apparatus (not shown) connected communicably (step S-5).

Receiving the encrypted electronic file, the information processing apparatus can specify the information processing apparatus that transmitted the electronic file by decrypting the electronic file, and therefore, the present invention further improves reliability of the electronic data. In other words, the present invention ensures reliability of the electronic data at high level.

The information processing apparatus 100 may conduct individual authentication of a person who operates (an operator) the information processing apparatus and may further attach, to the electronic data, the authentication information of the operator recorded when the individual authentication is conducted (step S-6). Receiving the encrypted electronic file including the authentication information in addition to the device information, the information processing apparatus not only can specify the information processing apparatus that transmitted the electronic file by decrypting the electronic file, but also can specify the operator of the information processing apparatus that transmitted the electronic file. Therefore, the present invention improves reliability of the electronic data furthermore.

The information processing apparatus 100 may generate a hash value of the electronic data (step S-7) and may further attach the hash value to the electronic data (step S-8). Receiving the encrypted electronic file further including the hash value in addition to the device information, the information processing apparatus not only can specify the information processing apparatus that transmitted the electronic file by decrypting the electronic file, but also can check tampering of the electronic data. Therefore, the present invention improves reliability of the electronic data furthermore.

The information processing apparatus 100 may acquire time information (time certificate) from an information communication terminal 200 communicably connected that conducts time authentication, and the information processing apparatus 100 may further attach the time information to the electronic data. Specifically, the information processing apparatus 100 extracts a hash value of the electronic data (step S-7) and transmits the extracted hash value to the information communication terminal 200. In this way, the information processing apparatus 100 requests, to the information communication terminal 200, issuance of a time stamp including the time information and the hash value at the time the information processing apparatus 100 acquired (read or received) the electronic data. The information processing apparatus 100 then receives from the information communication terminal 200 the time stamp corresponding to the issue request to the information communication terminal 200 and further attaches the time information included in the time stamp to the electronic data (step S-9). Receiving the encrypted electronic file including the time information in addition to the device information, the information processing apparatus not only can specify the information processing apparatus that transmitted the electronic file by decrypting the electronic file, but also can certify the acquisition time (reading time or reception time) of the electronic data. Therefore, the present invention improves reliability of the electronic data furthermore.

The information processing apparatus 100 may also encrypt at least one of the device information, the authentication information, the hash value, the time information, etc., with the confidential key, and may attach at least one of the encrypted device information, the authentication information, the hash value, the time information, etc., to the electronic data.

The TPM chip 10 may provide a storing unit that stores a confidential key specific to the device, a collecting unit that collects device information that is information in the device, as well as, an attaching unit that attaches information such as device information, a hash value, time information, and authentication information to the electronic data, and an encrypting unit that encrypts the electronic data with the attached device information, etc., with the confidential key.

Figure 2:
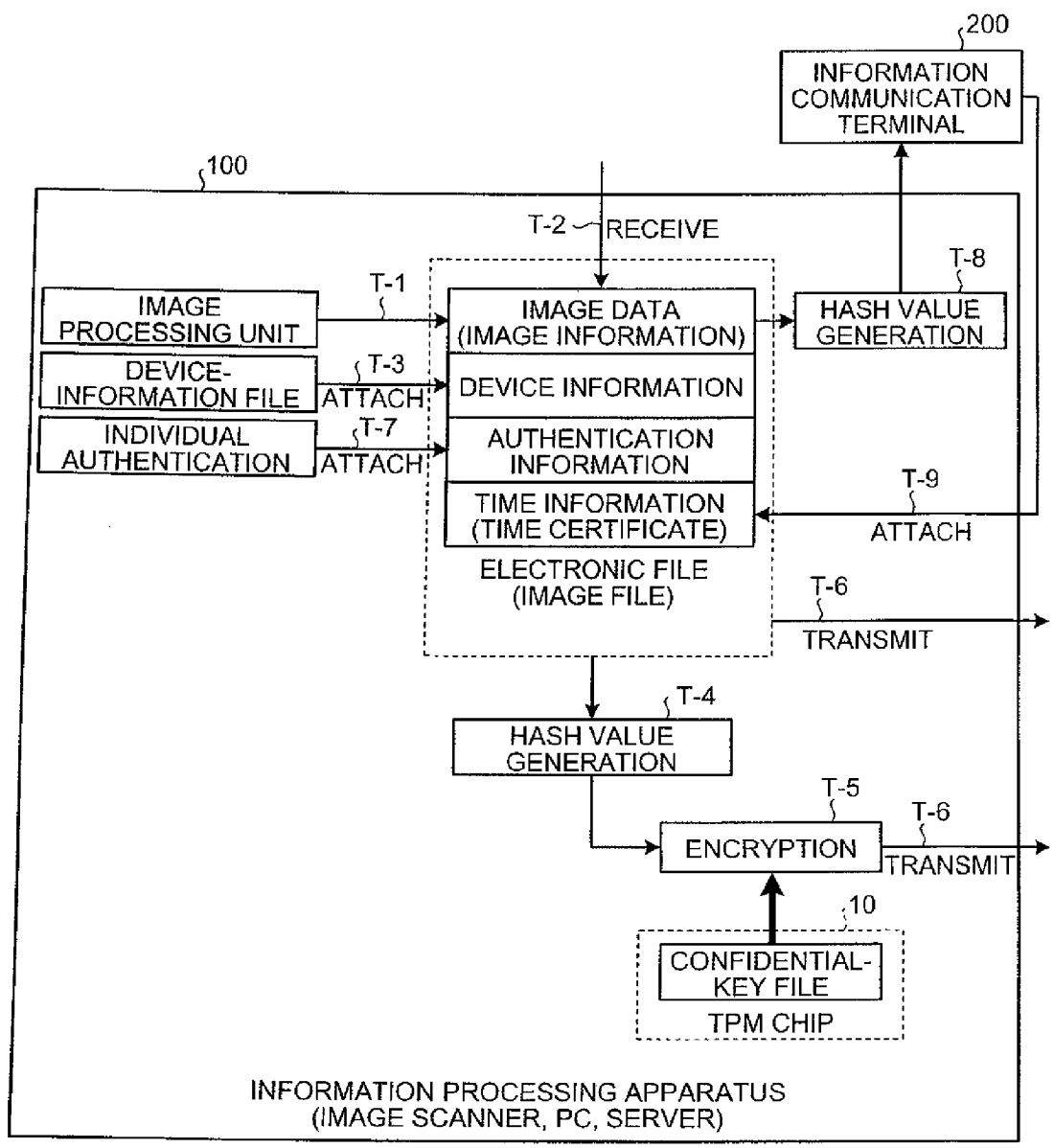

FIG. 2 is a schematic diagram for explaining a fundamental principle of the present invention.

The present invention briefly includes following fundamental features. The information processing apparatus 100 first acquires electronic data. Specifically, the information processing apparatus 100 reads the electronic data (e.g., image information) with a preset image processing unit when the image processing apparatus is an image reading apparatus such as an image scanner, a printer, a multi-function device, or a FAX (step T-1), and the information processing apparatus 100 receives the electronic data from another information processing apparatus communicably connected (not shown) when the information processing apparatus is, for example, a PC or a server (step T-2).

In the information processing apparatus 100, with a TPM chip 10 that is a chip having taper resistance and provided by the information processing apparatus, collects device information (apparatus information) that is information in a device (the information processing apparatus), and the information processing apparatus 100 stores the collected device information in a device-information file and attaches the device information to the electronic data (step T-3). This generates an electronic file (e.g., an image file when the electronic data is image information) including the electronic data and the device information.

The information processing apparatus 100 then generates a hash value of the electronic file generated at step T-3 (step T-4).

The information processing apparatus 100 then encrypts the hash value generated at step T-4 with a confidential key specific to the device (the information processing apparatus) stored in a confidential-key file provided by the TPM chip 10 (step T-5).

The information processing apparatus 100 then transmits the hash value encrypted at step T-5 and the electronic file generated at step T-3 to another information processing apparatus (not shown) connected communicably (step T-6).

The information processing apparatus that received the encrypted hash value and the electronic file can specify the information processing apparatus that transmitted the electronic file by decrypting the hash value, generating a hash value of the received electronic file, and collating the decrypted hash value and the generated hash value. Therefore the present invention further improves reliability of the electronic data. In other words, the present invention can ensure reliability of the electronic data at high level. The present invention improves reliability of the electronic data furthermore, since the present invention can check tampering of the electronic data.

The information processing apparatus 100 may conduct individual authentication of a person who operates (an operator) the information processing apparatus and may further attach, to the electronic data, the authentication information of the operator recorded when the individual authentication is conducted (step T-7). Receiving the electronic file including the authentication information in addition to the device information, the information processing apparatus not only can specify the information processing apparatus that transmitted the electronic file, but also can specify the operator of the information processing apparatus that transmitted the electronic file. Therefore, the present invention improves reliability of the electronic data furthermore.

The information processing apparatus 100 may acquire time information (time certificate) from the information communication terminal 200 connected communicably that conducts time authentication, and may further attach the time information to the electronic data. Specifically the information processing apparatus 100 first extracts a hash value of the electronic data (step T-8) and transmits the extracted hash value to the information communication terminal 200. In this way, the information processing apparatus 100 requests, to the information communication terminal 200, issuance of a time stamp including the time information and the hash value at the time the information processing apparatus acquired (read or received) the electronic data. The information processing apparatus 100 then receives, from the information communication terminal, the time stamp corresponding to the issue request to the information communication terminal 200 and further attaches the time information included in the time stamp to the electronic data (step T-9). Receiving the electronic file further including the time information in addition to the device information, the information processing apparatus not only can specify the information processing apparatus that transmitted the electronic file, but also can certify the acquisition time (reading time or reception time) of the electronic data. Therefore, the present invention improves reliability of the electronic data furthermore.

A configuration of the information processing system, etc., according to the present embodiment will be described with reference to FIGS. 3 to 9.

Figure 3:
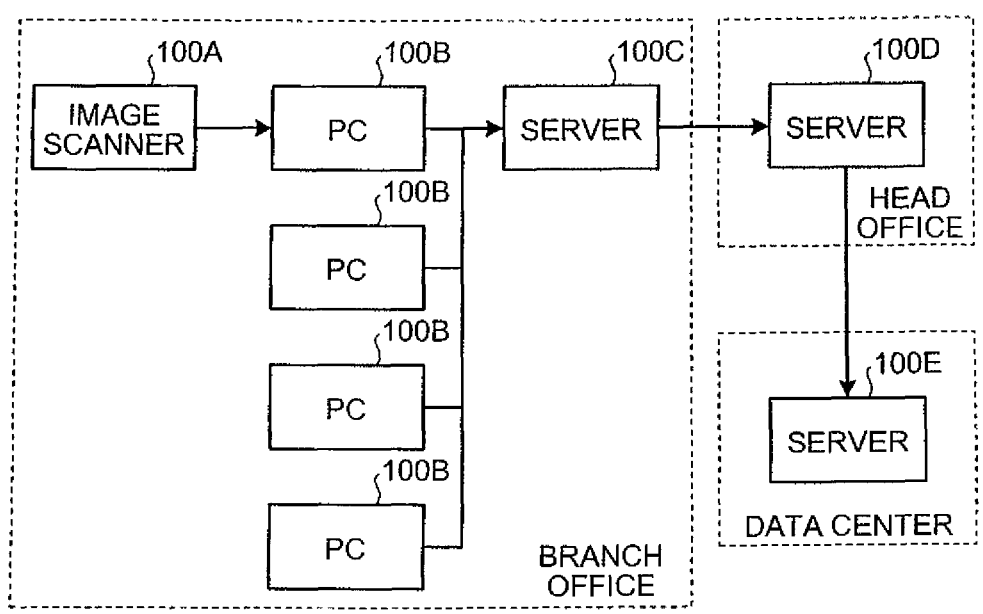
FIG. 3 is a block diagram of an example of an information processing system according to an embodiment of the present invention.

FIG. 3 is a block diagram of an example of an information processing system according to an embodiment of the present invention.

As shown in FIG. 3, the information processing system is configured by communicably connecting an image scanner 100A, a plurality of (4 in FIG. 3) PCs 100B, and a server 100C installed in a branch office, a server 100D installed in a head office, and a server 100E installed in a data center.

Figure 4:
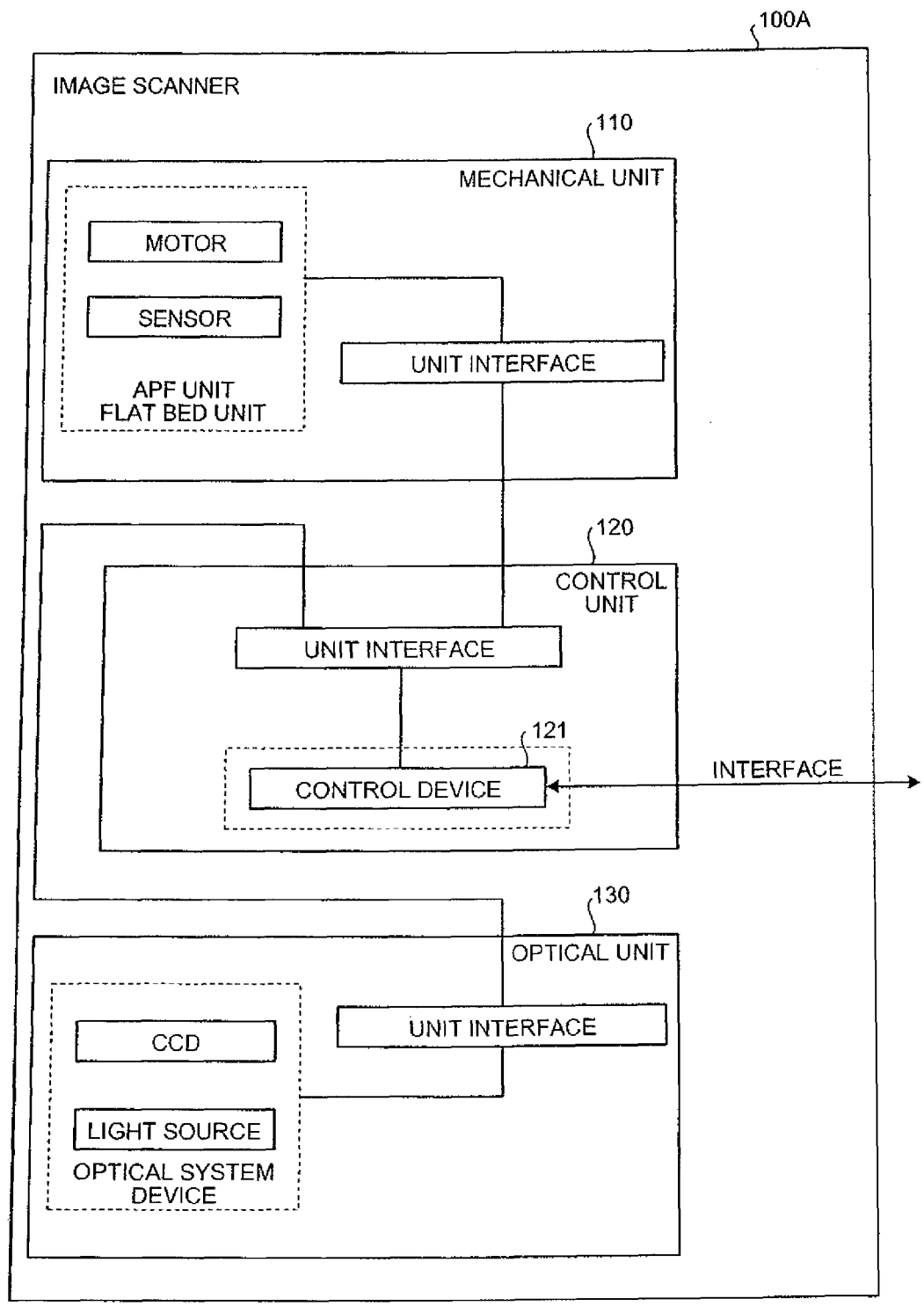
FIG. 4 is a block diagram of an example of an image scanner according to the present embodiment.

FIG. 4 is a block diagram of an example of an image scanner 100A according to the present embodiment, and only parts of the configuration related to the present invention are conceptually illustrated.

The image scanner 100A is provided as a part of the information processing apparatus 100 and specifically is an image scanner. As shown in FIG. 4, the image scanner 100A is configured to roughly at least provide a mechanical unit 110, a control unit 120, and an optical unit 130.

The mechanical unit 110 is configured by interconnecting an automatic paper feeding (APF) unit/flat bed unit including a motor, a sensor, etc., and a unit interface that is an interface for connecting the mechanical unit to another unit.

Figure 5:
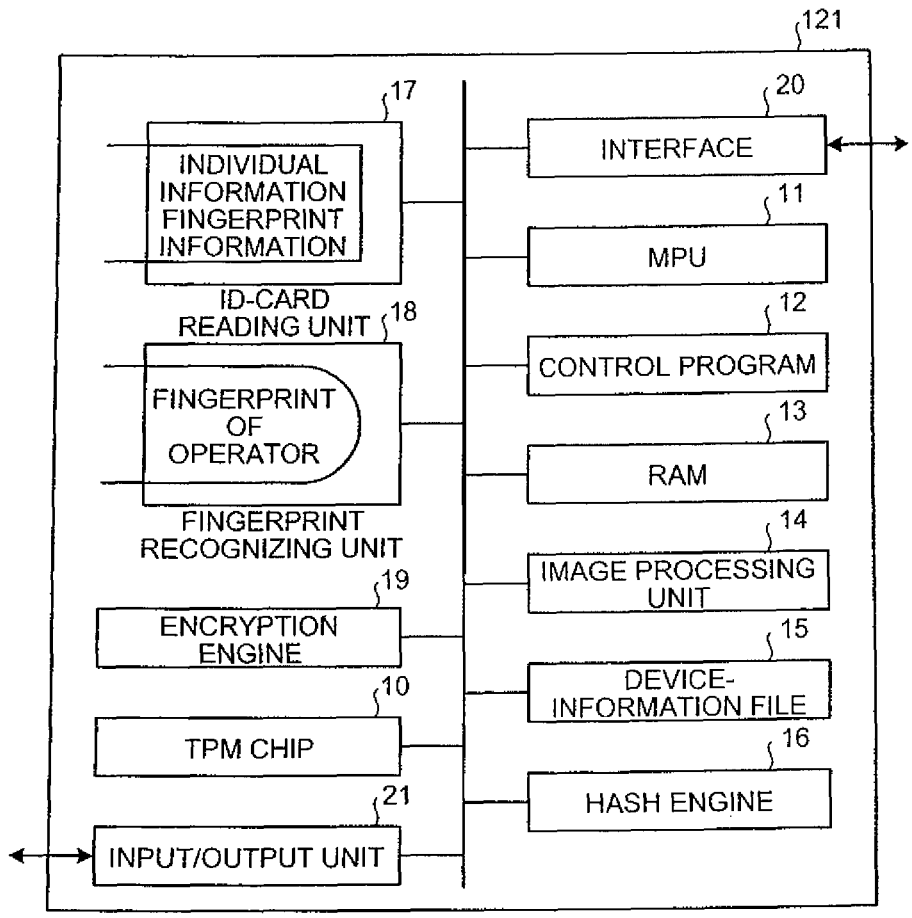
FIG. 5 is a block diagram of an example of a control device included in a control unit.

The control unit 120 is configured by interconnecting a control device 121 and a unit interface that is an interface connecting the control unit to another unit. FIG. 5 is a block diagram of an example of a control device 121 included in the control unit 120.

Figure 6:
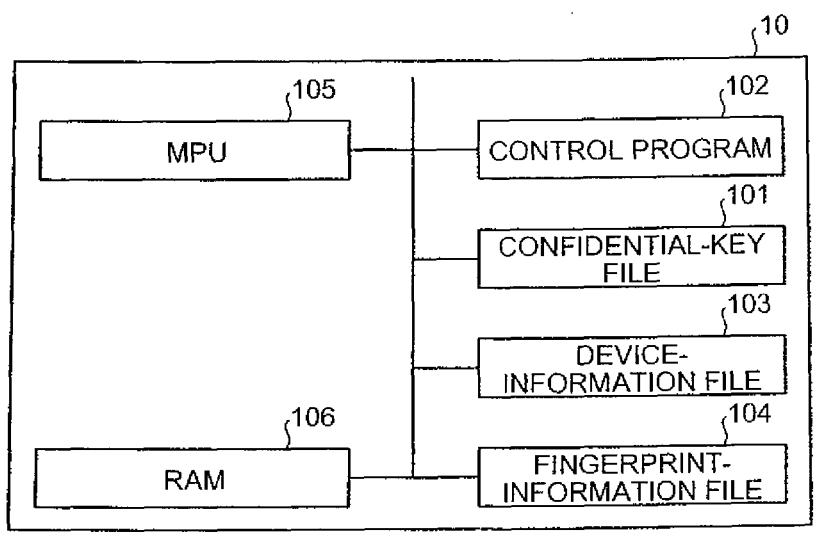
FIG. 6 is a block diagram of an example of a TPM chip.

As shown in FIG. 6, the control device 121 is configured by interconnecting, with bus lines as shown, an interface 20 that is an interface connecting the image scanner to another information processing apparatus (specifically, the PC 100B), an MPU (Micro Processing Unit) 11, a control program 12 that is a program controlling the units, a RAM (Random Access Memory) 13 storing, for example, log information (corresponding to the device operation state information) that includes setting information during unit operation and operation results, an image processing unit 14 that reads electronic data (e.g., image information), a device-information file 15 that stores device information, a hash engine 16 that extracts a hash value of the electronic data, an ID-card reading unit 17 that reads individual information and fingerprint information of the operator, a fingerprint recognizing unit 18 that recognizes the fingerprint of the operator, an encryption engine 19 that encrypts various information, a TPM chip 10, and an input/output unit 21 such as a keyboard, mouse, and a monitor.

FIG. 6 is a block diagram of an example of the TPM chip 10. The TPM chip 10 is a chip having tamper resistance and collects and stores information related to each unit. In addition to holding a confidential key inside, the TPM chip 10 collects information of devices and stores the information in a device (unit) information file. The information collected by the TPM chip 10 includes contents (e.g., a version number and a hash value) of a control program, an OS (Operating System), and a BIOS (Basic Input/Output System) and devices that are connected. Since the information collected by the TPM chip 10 is highly independent from the devices and faces no intrusion from outside, integrity of the devices can be confirmed using the collected data. As shown in FIG. 5, the TPM chip 10 is configured by interconnecting, with bus lines as shown, a confidential-key file 101 including a confidential key necessary for signing and encrypting, a control program 102, a device-information file 103, a fingerprint-information file 104, an MPU 105, and a RAM 106. The TPM chip 10 is installed in a housing of a unit in a manner that the chip is not easily removed from outside and that the unit cannot operate when the TPM chip is removed.

Returning to FIG. 3, in the optical unit 130, an optical system device including a CCD, a light source, etc., and a TPM chip 10 are interconnected through a unit interface.

Figure 7:
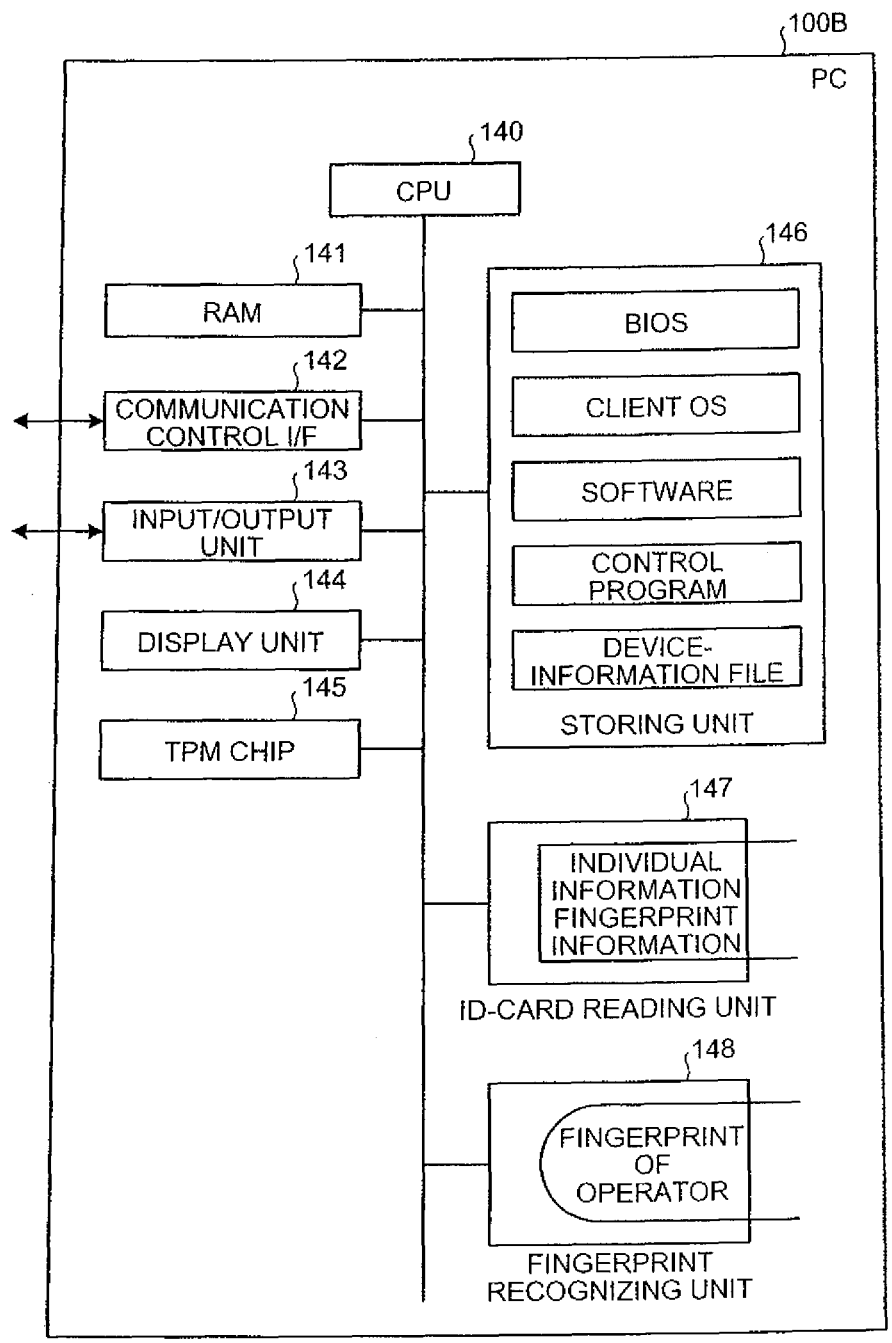
FIG. 7 is a block diagram of an example of a PC according to the present embodiment.

FIG. 7 is a block diagram of an example of the PC 100B according to the present embodiment, and only parts of the configuration related to the present invention are conceptually illustrated.

The PC 100B is provided as a part of the information processing apparatus 100. As shown in FIG. 7, the PC 100B is configured by connecting, with bus lines as shown, a CPU (Central Processing Unit) 140, a RAM 141 equivalent to the RAM 13 and the RAM 106, a communication control I/F 142 equivalent to the interface 20, an input/output unit 143 equivalent to the input/output unit 21, a display unit 144 such as a monitor, a TPM chip 145 equivalent to the TPM chip 10, a storing unit 146 such as a hard disk, an ID-card reading unit 147 equivalent to the ID-card reading unit 17, and a fingerprint recognizing unit 148 equivalent to the fingerprint recognizing unit 18. The storing unit 146 stores a BIOS, a client OS, software, a control program and a device-information file. Although the PC 100B does not provide an encryption engine or a hash engine as the image scanner 100A does, the personal computer B conducts encryption and generates a hash value with software. The PC 100B may provide hardware dedicated to encryption and generation of hash values similar to the image scanner 100A.

Figure 8:
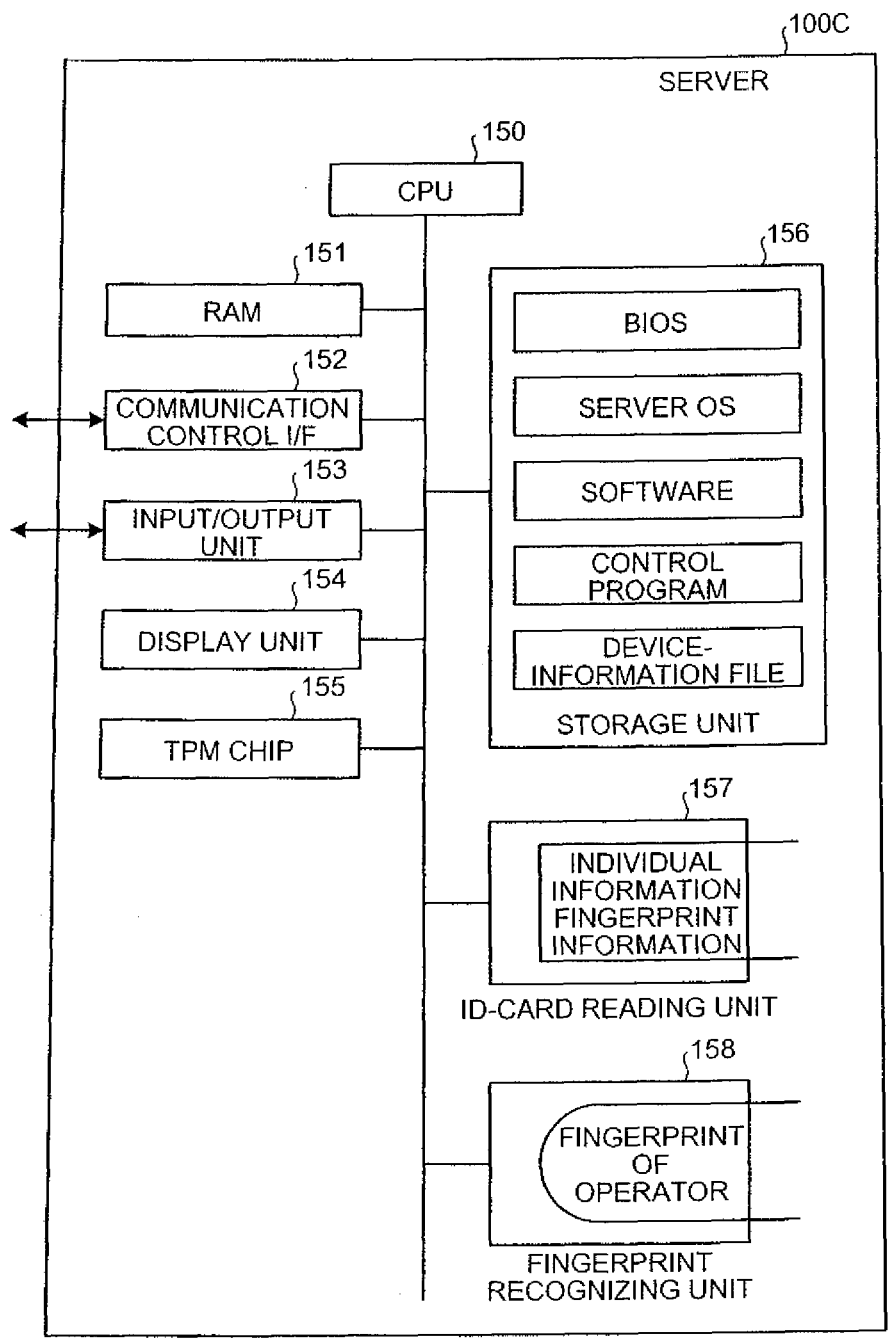
FIG. 8 is a block diagram of an example of a server according to the present embodiment.

Configurations of the servers 100C, 100D, and 100E according to the present embodiment will then be described with reference to FIG. 8. The configurations having in common with the image scanner 100A or the PC 100B will not be described. Since the configurations of the server 100C, the server 100D, and the server 100E are similar, the configuration of the server 100C will be described as a model. FIG. 8 is a block diagram of an example of the server 100C according to the present embodiment, and only parts of the configuration related to the present invention are conceptually illustrated.

The server 100C is provided as an information processing apparatus 100. As shown in FIG. 8, similar to the PC 100B, the server 100C is configured by connecting, with bus lines as shown, a CPU 150, a RAM 151, a communication control I/F 152, an input/output unit 143, a display unit 154, a TPM chip 155, a storing unit 156, an ID-card reading unit 157, and a fingerprint recognizing unit 158. Similar to the PC 100B, the storing unit 156 stores a BIOS, a client server OS, software, a control program, and a device-information file. Although the server 100C does not provide an encryption engine or a hash engine as the image scanner 100A does, the server 100*c* conducts encryption or generates a hash value with software. The server 100C may provide hardware dedicated to encryption or generation of hash values, similar to the image scanner 100A.

Figure 9:
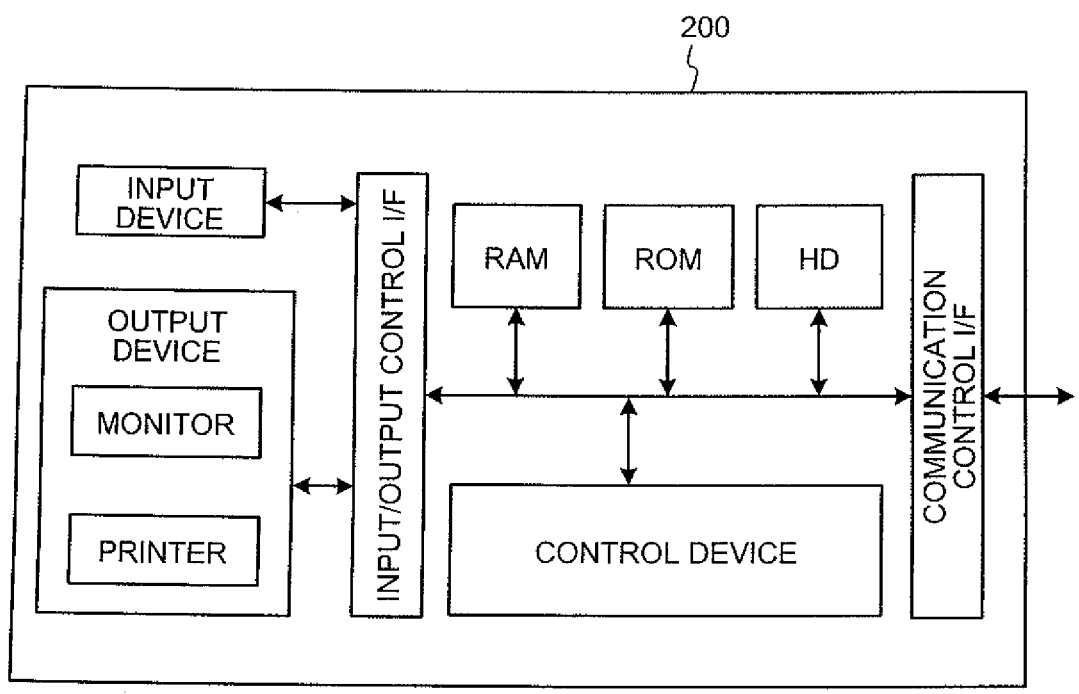
FIG. 9 is a block diagram of an example of an information communication terminal according to the present embodiment.

FIG. 9 is a block diagram of an example of the information communication terminal 200 according to the present embodiment, and only parts of the configuration related to the present invention is conceptually illustrated.

The information communication terminal 200 is an information communication terminal that is communicably connected to the image scanner 100A, the PC 100B, the server 100C, the server 100D, and the server 100E, and specifically is an information communication terminal installed at a time stamp authority (TSA). The information communication terminal 200 has functions of receiving issue requests (including hash values of the electronic data) of time stamps transmitted from the image scanner 100A, the PC 100B, the server 100C, the server 100D, and the server 100E, and of acquiring precise time information with respect to the received issue requests managed by the information communication terminal 200. The information communication terminal 200 then issues (transmits) the time stamps including hash values included in the acquired time information and received issue requests to the image scanner 100A, the PC 100B, the server 100C, the server 100D, and the server 100E. A hardware configuration of the information communication terminal 200 may be constituted with an information processing apparatus or with an attached device thereof such as a commercially available workstation and a personal computer. Functions of the information communication terminal 200 are realized by a control device such as a CPU configuring hardware, a storage device such as a hard disk drive and a memory device (RAM, ROM (Read Only Memory), etc.), an input device, an output device, an input/output interface, a communication controlling interface, a program controlling the devices, etc.

Figure 10:
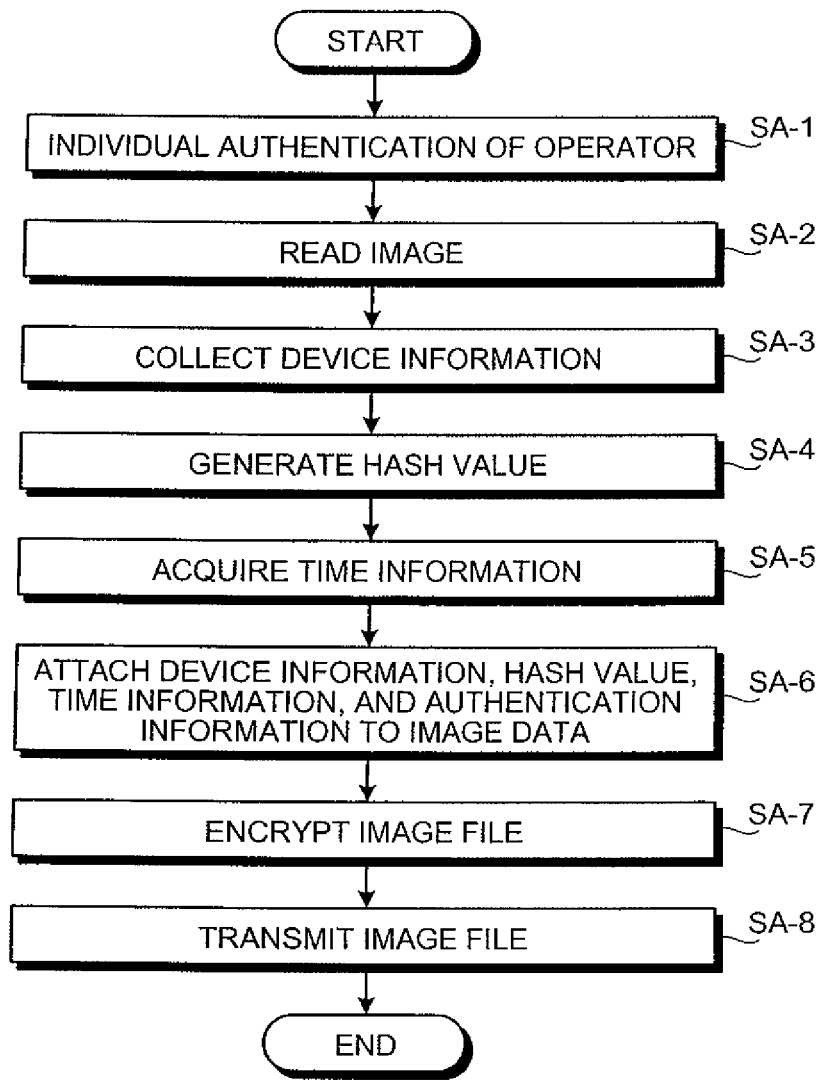
FIGS. 10 and 11 are flowcharts of a processing procedure for a main process of the image scanner according to the present embodiment.

FIG. 10 is a flowchart of a processing procedure for a main process of the main process of the image scanner 100A according to the present embodiment.

The image scanner 100A first conducts individual authentication of an operator (authentication unit: step SA-1).

When the authentication is confirmed, the image scanner 100A reads image information (data acquiring unit: step SA-2).

In the image scanner 100A, the TPM chip 10 collects device information (device-specific information, device operation state information including reading mode information, network information, peripheral device information, etc.) (collecting unit: step SA-3).

The image scanner 100A then extracts a hash value of the image information read at step SA-2 (generating unit: step SA-4).

By transmitting the hash value extracted at step SA-4 to the information communication terminal 200, the image scanner 100A requests issuance of a time stamp including time information and the hash value at the time of reading the image information to the information communication terminal 200, and by receiving the time stamp corresponding to the issue request from the information communication terminal 200, the image scanner 100A acquires reliable time information (time acquiring unit: step SA-5).

The image scanner 100A then attaches the authentication information of an operator recorded when conducting the individual authentication at step SA-1, the device information collected at step SA-3, the hash value extracted at step SA-4, and the time information acquired at step SA-5 to the image information read at step SA-2 and generates an image file including the authentication information, the device information, the hash value, the time information, and the image information (attaching unit, step SA-6). The TPM chip 10 may attach the authentication information, the device information, the hash value, and the time information to the image information to generate the image file.

The image scanner 100A then encrypts the image file generated at step SA-4 with a confidential key (encrypting unit: step SA-7). The TPM chip 10 may encrypt the image file with the confidential key.

The image scanner 100A then transmits the image file encrypted at step SA-7 to another information processing apparatus (e.g., the PC 100B, the server 100C, the server 100D, and the server 100E) (transmitting unit: step SA-8).

Figure 11:
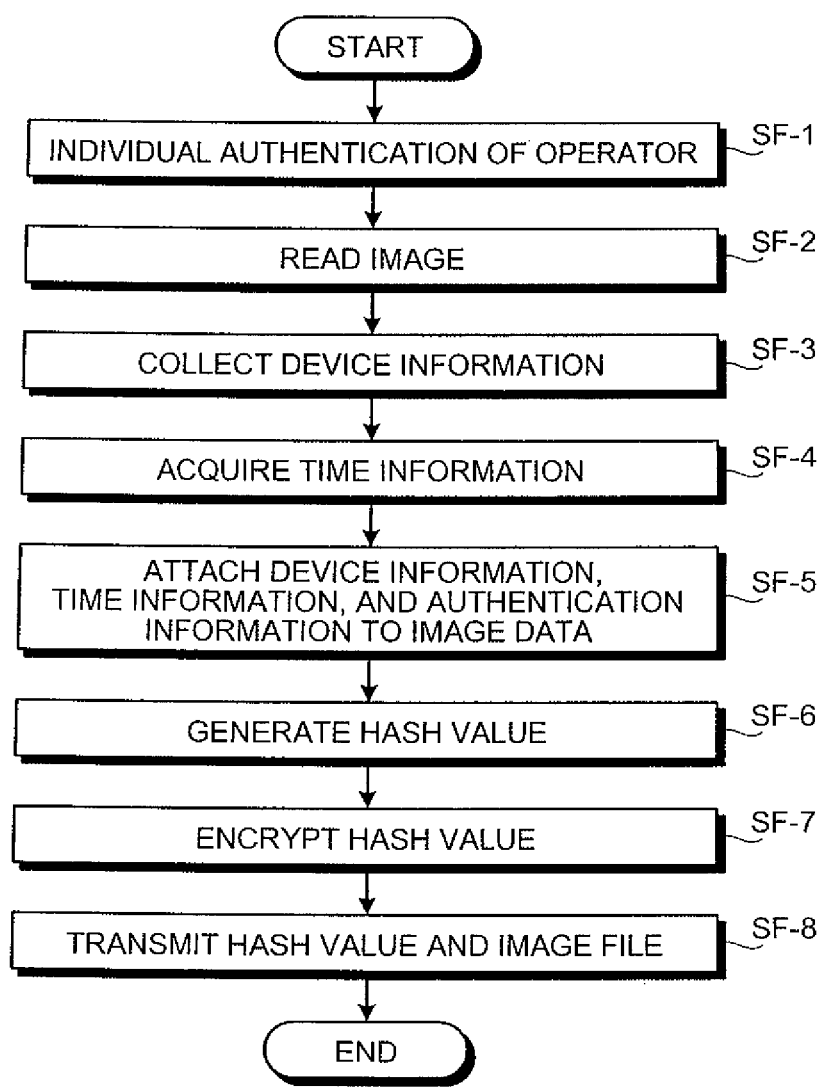

FIG. 11 is a flowchart of a processing procedure for a main process of the main process of the image scanner 100A according to the present embodiment.

The image scanner 100A first conducts individual authentication of the operator (authentication unit: step SF-1).

When the authentication is confirmed at step SF-1, the image scanner 100A reads image information (data acquiring unit: step SF-2).

In the image scanner 100A, the TPM chip 10 collects device information (device-specific information, device operation state information including reading mode information, network information, peripheral device information, etc.) (collecting unit: step SF-3).

The image scanner 100A then acquires reliable time information from the information communication terminal 200 (time acquiring unit: step SF-4). Specifically, by extracting a hash value of the image information read at step SF-2 and transmitting the extracted hash value to the information communication terminal 200, the image scanner 100A requests issuance of a time stamp including the time information and the hash value at the time of reading the image information to the information communication terminal 200, and the image scanner 100A receives the time stamp corresponding to the issue request from the information communication terminal 200.

The image scanner 100A then attaches the authentication information recorded when the individual authentication is conducted at step SF-1, the device information collected at step SF-3, and the time information acquired at step SF-4 to the image information read at step SF-2 and generates an image file including the authentication information, the device information, the time information, and the image information (attaching unit: step SF-5). The TPM chip 10 may attach the authentication information, the device information, and the time information to the image information and generate the image file.

The image scanner 100A then generates a hash value of the image file generated at step SF-5 (generating unit: step SF-6).

The image scanner 100A encrypts the hash value generated at step SF-6 with a confidential key (encrypting unit: step SF-7). The TPM chip 10 may encrypt the hash value with the confidential key.

The image scanner 100A then transmits the hash value encrypted at step SF-8 and the image file generated at step SF-5 to another information processing apparatus (e.g., the PC 100B, the server 100C, the server 100D, and the server 100E) (transmitting unit: step SF-8).

As described above, the information processing apparatus 100 (the image scanner 100A, the PC 100B, the server 100C, the server 100D, and the server 100E) attaches at least one of the device information, the hash value, the time information, the authentication information, etc., to the acquired electronic data (e.g., the image information), and the information processing apparatus 100 encrypts the electronic data attached with information with the confidential key and transmits the encrypted electronic data. In this way, high-level reliability of the electronic data can be ensured. Specifically, receiving the encrypted electronic data, the information processing apparatus can specify the information processing apparatus that transmitted the electronic data by decrypting the electronic data, and therefore reliability of the electronic data improve.

Receiving the encrypted electronic data, the information processing apparatus not only can specify the information processing apparatus that transmitted the electronic data by decrypting the electronic data, but also can specify the operator of the information processing apparatus that transmitted the electronic data as well as check tampering of the electronic data and certify the acquisition time (reading time or reception time) of the electronic data. As a result, reliability of the electronic data further improves.

The information processing apparatus 100 (the image scanner 100A, the PC 100B, the server 100C, the server 100D, and the server 100E) attaches at least one of the device information, the time information, the authentication information, etc., to the acquired electronic data (e.g., image information) and generates a hash value of the electronic data attached with information, and the information processing apparatus 100 then encrypts the hash value with a confidential key and transmits the electronic data attached with the encrypted hash value and the information. In this way, high-level reliability of the electronic data can be ensured. Specifically, receiving the encrypted hash value and the electronic data, the information processing apparatus can specify the information processing apparatus that transmitted the electronic data by decrypting the hash value to generate a hash value of the received electronic data and collating the decrypted hash value and the generated hash value. Therefore, reliability of the electronic data further improves. Receiving the encrypted hash value and the electronic data, the information processing apparatus not only can specify the information processing apparatus that transmitted the electronic data, but also can specify the operator of the information processing apparatus that transmitted the electronic data as well as check tampering of the electronic data and certify the acquisition time (reading time or reception time) of the electronic data. Therefore, reliability of the electronic data improves furthermore.

Other than the present embodiment described above, the present invention may be implemented in various other embodiments within the technical scope of the accompanying claims. For example, of the processes described in the present embodiment, all or parts of the processes that are described to be conducted automatically can be conducted manually and all or parts of the processes that are described to be conducted manually can be conducted automatically with known methods.

The information including the parameters of processing procedures, control procedures, specific names, various registration data, search conditions, etc., the image examples, and the database configurations described in the document and drawings above can be arbitrarily changed unless otherwise stated.

The components of the drawings are functional and conceptual and do not necessarily have to be physically configured as illustrated. For example, all or arbitrary parts of the processing functions provided by the units of the control device or by the devices can be realized by the CPU (Central Processing Unit) or by the programs interpreted and executed by the CPU, or the processing functions can be realized as hardware with wired logic. The programs are stored in a recording medium described below, and the control device mechanically reads the programs as necessary.

In a storage device such as a ROM or an HD, a computer program that collaborates with an OS (Operating System) and that gives a command to the CPU to conduct various processes is recorded. The computer program is executed by being loaded to a RAM, etc., and the computer program collaborates with the CPU and configures a controlling apparatus. The computer program may be recorded in an application program server connected through an arbitrary network, and all or a part of the computer program can be downloaded as necessary.

The programs of the present invention can be stored in computer readable recording media. The "recording media" include arbitrary "portable physical media" such as a flexible disk, a magneto-optical disk, a ROM, an EPROM, an EEPROM, a CD-ROM, an MO, a DVD, arbitrary "fixed physical media" such as a ROM, a RAM, an HD that are mounted on various computer systems, and "communication media" that hold the programs for a short period such as a communication line and a carrier wave when transmitting the programs through the network represented by a LAN, a WAN, and Internet.

The "program" is a data processing method described with an arbitrary language or a description method, and the program can be in any format such as in source code or in binary code. The "program" is not necessarily limited to a single configuration, but includes programs having dispersed configurations with a plurality of modules or libraries and programs achieving functions by collaborating with other programs represented by an OS. Known configurations and procedures can be used for, such as, specific configurations for reading the recording media at each unit according to the present embodiment, reading procedures, and installing procedures after reading.

Specific configurations of distribution and integration of the devices are not limited to the configurations in the drawings, and all or some of the configurations can be configured by functionally or physically distributing and integrating in arbitrary units in compliance with various loads, etc. For example, each database may be independently configured as an independent database device, and a part of the processes may be realized by using the CGI (Common Gateway Interface).

Figure 12:
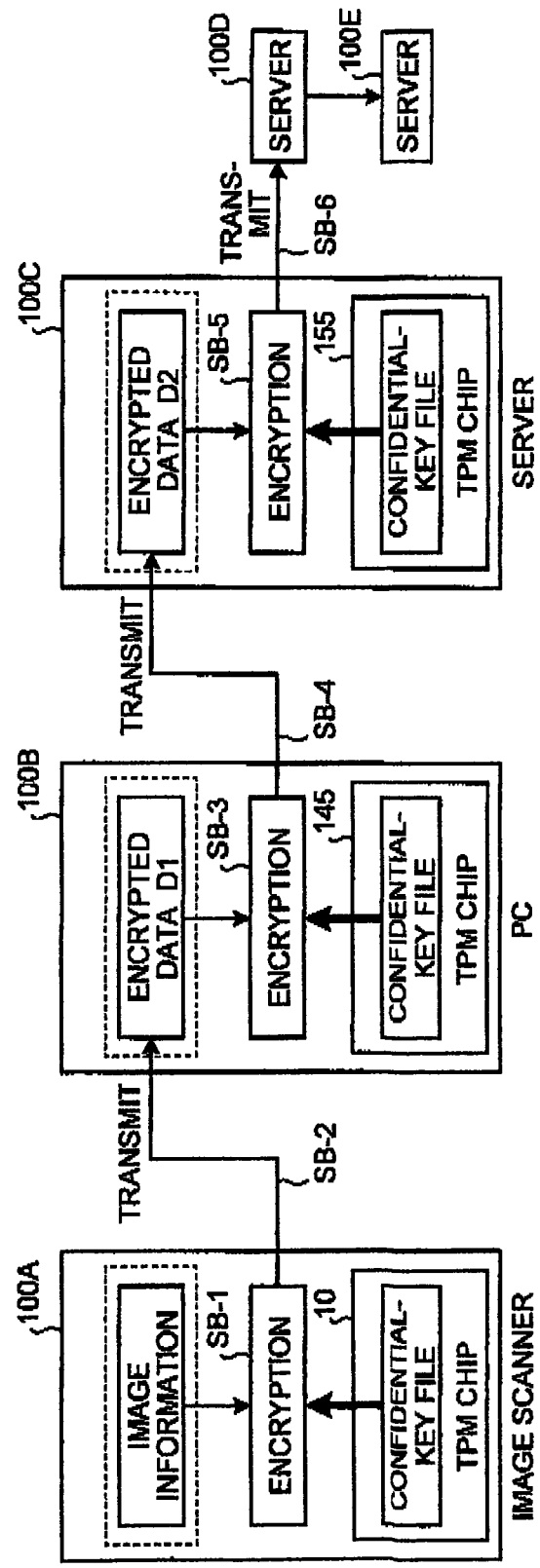
FIG. 12 is a schematic diagram for explaining an example of a transfer process of electronic data among apparatuses configuring the information processing system according to the present embodiment.

One example of a transfer process of the electronic data (image information) among apparatuses configuring the information processing system of FIG. 2 according to the present embodiment described above will now be described with reference to FIG. 12. FIG. 12 is a schematic diagram for explaining an example of a transfer process of the electronic data among apparatuses configuring the information processing system according to the present embodiment.

As shown in FIG. 12, the image scanner 100A first encrypts the read image information using the confidential key stored in the TMP chip 10 and creates encrypted data D1 (step SB-1) and transmits (transfers) the encrypted data D1 to the PC 100B (step SB-2).

The PC 100B that received the encrypted data D1 from the image scanner 100A encrypts the encrypted data D1 using the confidential key stored in the TPM chip 145 and creates encrypted data D2 (step SB-3) and transmits the encrypted data D2 to the server 100C (step SB-4).

The server 100C that received the encrypted data D2 from the PC 100B encrypts the received encrypted data D2 using the confidential key stored in the TPM chip 15 and creates encrypted data D3 (step SB-5) and transmits the encrypted data D3 to the server 100D (see FIG. 2) (step SB-6).

The server 100D that received the encrypted data D3 from the server 100C encrypts the received encrypted data D3 using the confidential key stored in the TPM chip 155 and creates encrypted data D4, and the server 100D then transmits the encrypted data D4 to the server 100E (see FIG. 2).

The server 100E that received the encrypted data D4 from the server 100D sequentially decrypts the encrypted data D4. In this way, through which route the image information was transmitted can be confirmed, and the apparatus (the image scanner 100A that inputted the image information) that first transmitted the data can also be specified.

Figure 13:
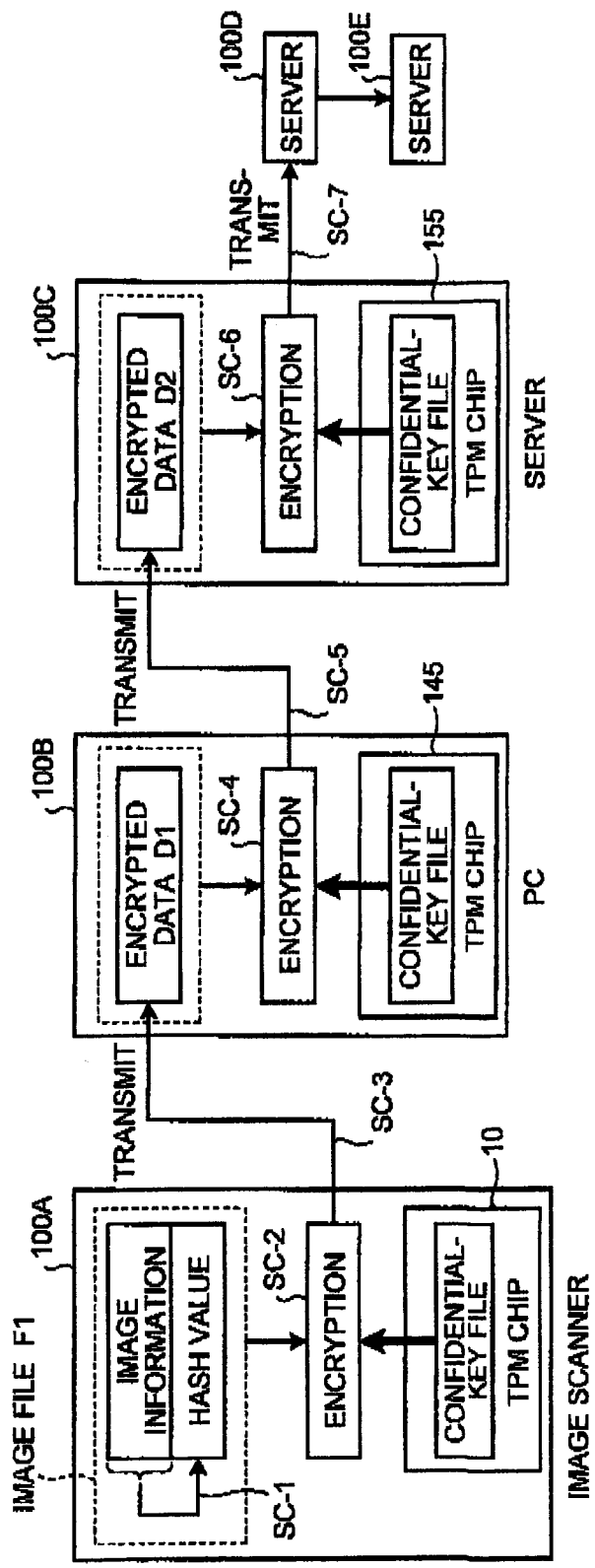
FIG. 13 is a schematic diagram for explaining an example of a transfer process of electronic data among apparatuses configuring the information processing system according to the present embodiment

One example of a transfer process of the electronic data (image information) among apparatuses configuring the information processing system of FIG. 2 according to the present embodiment described above will be described with reference to FIG. 13. FIG. 13 is a diagram of one example of a transfer process of the electronic data among apparatuses configuring the information processing system according to the present embodiment.

As shown in FIG. 13, the image scanner 100A first extracts a hash value of the read image information and attaches the extracted hash value to the image information to create an image file F1 (step SC-1), and the image scanner 100A encrypts the created image file F1 using a confidential key stored in the TPM chip 10 and creates encrypted data D1 (step SC-2) and transmits the encrypted data D1 to the PC 100B (step SC-3). In other words, the image scanner 100A transmits data by combining encryption and electronic signature.

The PC 100B that received the encrypted data D1 from the image scanner 100A encrypts the received encrypted data D1 using the confidential key stored in the TPM chip 145 and creates encrypted data D2 (step SC-4) and transmits the encrypted data D2 to the server 100C (step SC-5).

The server 100C that received the encrypted data D2 from the PC 100B encrypts the received encrypted data D2 using the confidential data stored in the TPM chip 155 and creates encrypted data D3 (step SC-6) and transmits the encrypted data D3 to the server 100D (see FIG. 2) (step SC-7).

The server 100D that received the encrypted data D3 from the server 100C encrypts the received encrypted data D3 using the confidential key stored in the TPN chip 155 and creates encrypted data D4, and the server 100C then transmits the encrypted data D4 to the server 100E (see FIG. 2).

The server 100E that received the encrypted data D4 from the server 100D sequentially decrypts the encrypted data D4. In this way, through which route the image information was transmitted can be confirmed, and the apparatus (the image scanner 100A that inputted the image information) that first transmitted the data can also be specified. By extracting the hash value of the decrypted image information and comparing the extracted hash value and the decrypted hash value, whether the image information is tampered can be confirmed.

Figure 14:
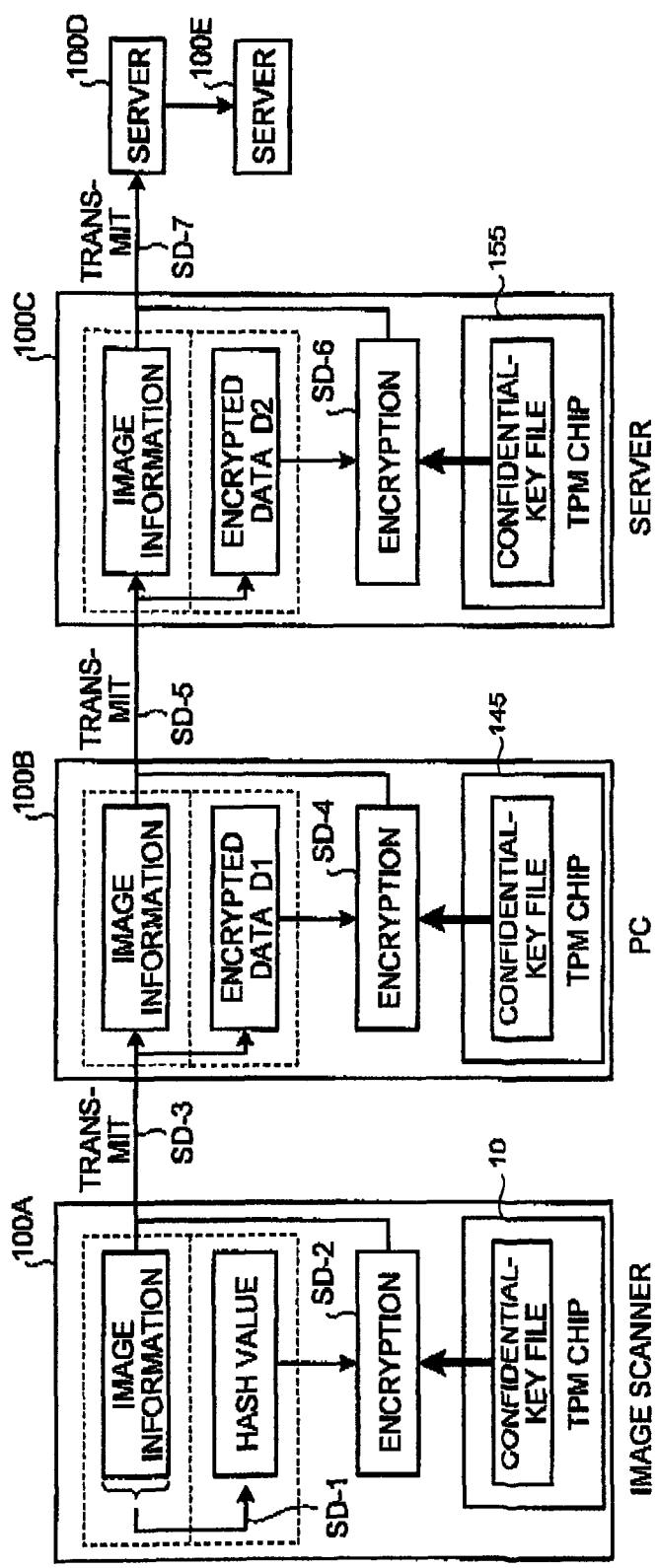
FIG. 14 is a schematic diagram for explaining an example of a transfer process of electronic data among apparatuses configuring the information processing system according to the present embodiment.

One example of a transfer process of the electronic data (image information) among apparatuses configuring the information processing system of FIG. 2 according to the present embodiment will be described with reference to FIG. 14. FIG. 14 is a diagram of one example of a transfer process of the electronic data among the apparatuses configuring the information processing system according to the present embodiment.

As shown in FIG. 14, the image scanner 100A first extracts the hash value of the read image information (step SD-1). The image scanner 100A then encrypts the extracted hash value using the confidential key stored in the TPM chip 10 and creates encrypted data D1 (step SD-2) and transmits the encrypted data D1 and the image information to the PC 100B (step D-3). In other words, the image scanner 100A transmits the data by electronically signing.

The PC 100B that received the encrypted data D1 and the image information from the image scanner 100A encrypts the encrypted data D1 using the confidential key stored in the TPM chip 145 and creates encrypted data D2 (step SD-4) and transmits the encrypted data D2 and the image information to the server 100C (step SD-5).

The server 100C that received the encrypted data D2 and the image information encrypts the received encrypted data D2 using the confidential key stored in the TPM chip 155 and creates the encrypted data D3 (step SD-6) and transmits the encrypted data D3 and the image information to the server 100D (see FIG. 2) (step SD-7).

The server 100D that received the encrypted data D3 and the image information from the server 100C encrypts a confidential key stored in the TPM chip 155 and creates encrypted data D4, and the server 100D then transmits the encrypted data D4 and the image information to the server 100E (see FIG. 2).

The server 100E that received the encrypted data D4 and the image information from the server 100D sequentially decrypts the encrypted data D4. In this way, through which route the image information was transmitted can be confirmed, and the apparatus (the image scanner 100A that inputted the image information) that first transmitted the data can also be specified. By extracting the hash value of the image information and comparing the extracted hash value and the decrypted hash value, whether the image information is tampered can be confirmed. Comparing to example 2, example 3 can reduce the processing time required for encryption.

One example of a transfer process of the electronic data (image information) among apparatuses configuring the information processing system of FIG. 2 according to the present embodiment will be described with reference to FIG. 15. FIG. 15 is a diagram of one example of a transfer process of the electronic data among the apparatuses configuring the information processing system according to the present embodiment.

As shown in FIG. 15, the image scanner 100A attaches at least one of the acquired time information, the authentication information recorded when conducting the individual authentication, and the device information collected by the TPM chip10 to the read image information and creates an image file F1, and the image scanner 100A then extracts a hash value of the created image file F1 and further attaches the extracted hash value to the image file F1 (step SE-1). The image scanner 100A then encrypts the image file F1 further attached with the hash value using a confidential key stored in the TPM chip 10 and creates encrypted data D1 (step SE-2) and transmits the encrypted data D1 to the PC 100B (step SE-3). In other words, the image scanner 100A transmits data by combining encryption and electronic signature.

The PC 100B that received the encrypted data D1 from the image scanner 100A attaches at least one of the acquired time information, the authentication information recorded when conducting the individual authentication, and the device information collected by the TPM chip 145 to the received encrypted data D1 to create an image file F2, and the PC 100B then extracts a hash value of the created image file F2 and further attaches the extracted hash value to the image file F2 (step SE-4). The PC 100B then encrypts the image file F2 further attached with the hash value using the confidential key stored in the TPM chip 145 and creates encrypted data D2 (step SE-5) and transmits the encrypted data D2 to the server 100C (step SE-6). In other words, the PC 100B transmits data by combining encryption and electronic signature.

The server 100C that received the encrypted data D2 from the PC 100B attaches at least one of the acquired time information, the authentication information recorded when conducting the individual authentication, and the device information collected by the TPM chip 155 to the received encrypted data D2 to create image file F3, and the server 100C then extracts a hash value of the created image file F3 and further attaches the extracted hash value to the image file F3 (step SE-7). The server 100C then encrypts the image file F3 further attached with the hash value using the confidential key stored in the TPM chip 155 and creates encrypted data D3 (step SE-8) and transmits the encrypted data D3 to the server 100D (see FIG. 2) (step SE-9). In other words, the server 100C transmits data by combining encryption and electronic signature.

The server 100D that received the encrypted data D3 from the server 100C attaches at least one of the acquired time information, the authentication information recorded when conducting the individual authentication, and the device information collected by the TPM chip 155 to the received encrypted data 3 to create image file F4. The server 100D then extracts a hash value of the created image file F4 and further attaches the extracted hash value to the image file F4, and the server 100D encrypts the image file F4 further attached with the hash value using the confidential key stored in the TPM chip 155 to create encrypted data D4 and transmits the encrypted data D4 to the server 100E (see FIG. 2). In other words, the server 100D transmits data by combining encryption and electronic signature.

The server 100E that received the encrypted data D4 from the server 100D sequentially decrypts the encrypted data D4. In this way, through which route the image information was transmitted can be confirmed, and the apparatus (the image scanner 100A that inputted the image information) that first transmitted the data can also be specified. The information of the devices and the times of the information passing through the devices can be recognized, and the operators of the devices can also be specified. By extracting the hash value of the decrypted data and comparing the extracted hash value and the attached hash values, whether the data is tampered during transmission can also be confirmed.

As describe above, according to an embodiment of the present invention, electronic data is acquired, the chip collects the device information, the device information is attached to the electronic data (e.g., image information), and the electronic data attached with the device information is encrypted with the confidential key, therefore, the present invention accomplishes a successful outcome of, such as, ensuring high-level reliability of the electronic data (e.g., image information).

Furthermore, according to an embodiment of the present invention, the electronic data is acquired, the chip collects the device information, the device information is attached to the electronic data (e.g., image information), the hash value of the electronic data with attached device information is generated, and the hash value is encrypted with the confidential key, therefore, the present invention accomplishes a successful outcome of, such as, ensuring high-level reliability of the electronic data (e.g., image information).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system, comprising more than two information processing apparatuses which are communicably connected with each other along a transfer route, wherein
each of the information processing apparatuses other than the information processing apparatus at the end of the transfer route includes:
a data acquiring unit that acquires image data;
a tamper-resistant chip including
a storing unit that stores a confidential key specific to a device; and
a collecting unit that collects operation-state information related to an operation state of the device at a time of acquiring the image data;
an authentication unit that conducts an individual authentication of a user;
an attaching unit that attaches the collected operation-state information and authentication information of the user recorded at a time of the individual authentication to the acquired image data;
an encrypting unit that encrypts the acquired image data with the operation-state information and the authentication information attached, using the confidential key; and
a transmitting unit that transmits the encrypted image data to another information processing apparatus among the information processing apparatuses, and
the information processing apparatus at the end of the transfer route includes:
a decrypting unit that receives the encrypted image data transferred among the information processing apparatuses, and sequentially decrypts the encrypted image data so as to confirm the transfer route of the encrypted image data, specify the information processing apparatus that first transmitted the encrypted image data, and specify the respective users of the information processing apparatuses along said transfer route.

2. The information processing system according to claim 1, each of the information processing apparatuses other than the information processing apparatus at the end of the transfer route further comprising:
at least one of
a generating unit that generates a hash value; and
a time acquiring unit that acquires time information from an information communication terminal that conducts time authentication, wherein
the attaching unit further attaches at least one of the generated hash value and the acquired time information to the acquired image data, and
the encrypting unit encrypts the image data with at least one of the hash value and the time information attached, using the confidential key.

3. The information processing system according to claim 1, wherein
the collecting unit further collects at least one of device-specific information that is information specific to the device;
network information that is information related to a network; and
a peripheral-device information that is information related to a connected peripheral device,
the attaching unit further attaches at least one of the device-specific information, the network information, and the peripheral-device information to the acquired image data, and
the encrypting unit encrypts the acquired image data with the operation-state information, the authentication information, and at least one of the device-specific information, the network information, and the peripheral-device information attached, using the confidential key.

4. The information processing system according to claim 1, wherein the operation-state information includes operation mode information, an operation log, setting information during operation, and an operation result.

5. An information processing system, comprising more than two information processing apparatuses which are communicably connected with each other along a transfer route, wherein
each of the information processing apparatuses other than the information processing apparatus at the end of the transfer route includes:
a data acquiring unit that acquires image data;
a tamper-resistant chip including
a storing unit that stores a confidential key specific to a device; and
a collecting unit that collects operation-state information related to an operation state of the device at a time of acquiring the image data;
an authentication unit that conducts an individual authentication of a user, said individual authentication comprising at least recognizing fingerprint information of the user;
an attaching unit that attaches the collected operation-state information and authentication information of the user recorded at a time of the individual authentication to the acquired image data;
a generating unit that generates a hash value of the acquired image data with the operation-state information and the authentication information attached;
an encrypting unit that encrypts the generated hash value using the confidential key; and
a transmitting unit that transmits the encrypted hash value to another information processing apparatus among the information processing apparatuses, and
the information processing apparatus at the end of the transfer route includes:
a decrypting unit that receives the encrypted hash value transferred among the information processing apparatuses, and sequentially decrypts the encrypted hash value so as to confirm the transfer route of the encrypted hash value, specify the information processing apparatus that first transmitted the encrypted hash value, and specify the respective users of the information processing apparatuses along said transfer route.

6. The information processing system according to claim 5, each of the information processing apparatuses other than the information processing apparatus at the end of the transfer route further comprising:
a time acquiring unit that acquires time information from an information communication terminal that conducts time authentication, wherein
the attaching unit further attaches the acquired time information to the acquired image data, and
the generating unit generates the hash value of the image data with the time information further attached.

7. The information processing system according to claim 5, wherein
the collecting unit further collects at least one of device-specific information that is information specific to the device;
network information that is information related to a network; and
a peripheral-device information that is information related to a connected peripheral device,
the attaching unit further attaches at least one of the device-specific information, the network information, and the peripheral-device information to the acquired image data, and
the generating unit generates a hash value of the acquired image data with the operation-state information, the authentication information, and at least one of the device-specific information, the network information, and the peripheral-device information attached.

8. The information processing system according to claim 5, wherein the operation-state information includes operation mode information, an operation log, setting information during operation, and an operation result.

9. An information processing method in an information processing system including more than two information processing apparatuses communicably connected with each other along a transfer route, wherein
the method comprises the following steps executed on each of the information processing apparatuses other than the information processing apparatus at the end of the transfer route:
acquiring image data;
collecting operation-state information related to an operation state of the device at a time of acquiring the image data, at a tamper-resistant chip that stores a confidential key specific to the device;
conducting an individual authentication of a user;
attaching the collected operation-state information and authentication information of the user recorded at a time of the individual authentication to the acquired image data;
encrypting the acquired image data with the operation-state information and the authentication information attached, using the confidential key; and
transmitting the encrypted image data to another information processing apparatus among the information processing apparatuses, and
the method further comprises the following steps executed on the information processing apparatus at the end of the transfer route:
receiving the encrypted image data transferred among the information processing apparatuses, and
sequentially decrypting the encrypted image data so as to confirm the transfer route of the encrypted image data, specify the information processing apparatus that first transmitted the encrypted image data, and specify the respective users of the information processing apparatuses along said transfer route.

10. The information processing method according to claim 9, wherein the operation-state information includes operation mode information, an operation log, setting information during operation, and an operation result.

11. An information processing method in an information processing system including more than two information processing apparatuses communicably connected with each other along a transfer route, wherein
the method comprises the following steps executed on each of the information processing apparatuses other than the information processing apparatus at the end of the transfer route:
acquiring image data;
collecting operation-state information related to an operation state of the device at a time of acquiring the image data, at a tamper-resistant chip that stores a confidential key specific to the device;
conducting an individual authentication of a user;
attaching the collected operation-state information and authentication information of the user recorded at a time of the individual authentication to the acquired image data;
generating a hash value of the acquired image data with the operation-state information and the authentication information attached;
encrypting the generated hash value using the confidential key; and
transmitting the encrypted hash value to another information processing apparatus among the information processing apparatuses, and
the method further comprises the following steps executed on the information processing apparatus at the end of the transfer route:
receiving the encrypted hash value transferred among the information processing apparatuses, and
sequentially decrypting the encrypted hash value so as to confirm the transfer route of the encrypted hash value, specify the information processing apparatus that first transmitted the encrypted hash value, and specify the respective users of the information processing apparatuses along said transfer route.

12. The information processing method according to claim 11, wherein the operation-state information includes operation mode information, an operation log, setting information during operation, and an operation result.

13. A computer program product comprising a non-transitory computer-readable medium having computer-executable program codes embodied in the medium that, when executed by each of more than two information processing apparatuses communicably connected with each other along a transfer route in an information processing system, cause
the information processing apparatus other than the information processing apparatus at the end of the transfer route to execute:
acquiring image data;
collecting operation-state information related to an operation state of the device at a time of acquiring the image data, tamper-resistant chip that stores a confidential key specific to the device;

conducting an individual authentication of a user;

attaching collected operation-state information and authentication information of the user recorded at a time of the individual authentication to acquired image data;

encrypting the acquired image data with the operation-state information and the authentication information attached, using the confidential key; and transmitting the encrypted image data to another information processing apparatus among the information processing apparatuses, and the information processing apparatus at the end of the transfer route to execute:

receiving the encrypted image data transferred among the information processing apparatuses, and sequentially decrypting the encrypted image data so as to confirm the transfer route of the encrypted image data, specify the information processing apparatus that first transmitted the encrypted image data, and specify the respective users of the information processing apparatuses along said transfer route.

14. The computer program product according to claim 13, wherein the operation-state information includes operation mode information, an operation log, setting information during operation, and an operation result.

15. A computer program product comprising a non-transitory computer-readable medium having computer-executable program codes embodied in the medium that, when executed by each of more than two information processing apparatuses communicably connected with each other along a transfer route in an information processing system, cause the information processing apparatus other than the information processing apparatus at the end of the transfer route to execute:

acquiring image data;

collecting operation-state information related to an operation state of the device at a time of acquiring the image data, tamper-resistant chip that stores a confidential key specific to the device;

conducting an individual authentication of a user;

attaching collected operation-state information and authentication information of the user recorded at a time of the individual authentication to acquired image data;

generating a hash value of the acquired image data with the operation-state information and the authentication information attached;

encrypting generated hash value using the confidential key; and transmitting the encrypted hash value to another information processing apparatus among the information processing apparatuses, and the information processing apparatus at the end of the transfer route to execute:

receiving the encrypted hash value transferred among the information processing apparatuses, and sequentially decrypting the encrypted hash value so as to confirm the transfer route of the encrypted hash value, specify the information processing apparatus that first transmitted the encrypted hash value, and specify the respective users of the information processing apparatuses along said transfer route.

16. The computer program product according to claim 15, wherein the operation-state information includes operation mode information, an operation log, setting information during operation, and an operation result.

* * * * *